Oct. 22, 1968     H. V. LICHTENBERGER     3,407,117
NUCLEAR REACTOR CONTROL ROD WITH GUIDE MEMBERS

Filed Feb. 15, 1967     2 Sheets-Sheet 1

INVENTOR.
HAROLD V. LICHTENBERGER
BY
Eldon H. Lutter
ATTORNEY

United States Patent Office 3,407,117
Patented Oct. 22, 1968

3,407,117
NUCLEAR REACTOR CONTROL ROD WITH GUIDE MEMBERS
Harold V. Lichtenberger, West Simsbury, Conn., assignor to Combustion Engineering, Inc., Windsor, Conn., a corporation of Delaware
Continuation-in-part of application Ser. No. 493,512, Oct. 6, 1965. This application Feb. 15, 1967, Ser. No. 620,586
14 Claims. (Cl. 176—86)

ABSTRACT OF THE DISCLOSURE

A control rod arrangement for a nuclear reactor with the rod being comprised of longitudinally arranged tubes bonded together. Interspersed among the tubes is a guide rod for contacting a guide member in the passage in the core of the reactor which is to receive the control rod.

Description of the invention

This is a continuation-in-part application of U.S. application Ser. No. 493,512, filed Oct. 6, 1965, now abandoned.

This invention relates generally to control rods as employed to control the reactivity in a nuclear reactor with the invention having particular relation to such an improved control rod construction which lends itself to simplified and more economic manufacturing than could be obtained with the designs heretofore utilized.

In accordance with the invention the control rod is comprised of one or more flat members which, in effect, form blades with these flat members being made up of a series of tubes having circular transverse sections and with the tubes being in side-by-side coplanar parallel relation. The tubes are hermetically sealed by means of end caps which are welded to the tubes and the tubes are formed into a rigid blade or member by bonding adjacent tubes together throughout their length. Suitable end fittings are provided at each end of the blade so as to provide a connection for the blade with a control rod drive and a follower blade if the latter is employed. The blades are formed or provided with rubbing rods which are coplanar with the blade and extend adjacent to and throughout the length of the blade, being bonded to the adjacent tube or tubes throughout the length of the blade. These rubbing rods may have a lateral dimension that is greater than the diameter of the tubes of which the blade is formed such that they project each side of the tubes and act as rubbing rods during manipulation of the control rod in the control rod channel in the core of the reactor or, alternatively, the channel may be provided with guides or extensions directed inwardly to engage these rods. The reactor core may be comprised of a plurality of so-called fuel assemblies which are made up in general of parallel arranged fuel tubes with these tubes being in spaced relation. At predetermined locations in the assembly, in lieu of a fuel tube there may be provided a guide rod which may be in the form of a tube of somewhat larger diameter than the fuel tubes such that this rod will extend laterally outward from the fuel assembly and into the channel provided between adjacent assemblies for receipt of the control rod. This guide rod will then form the inwardly directed guide or extension previously mentioned. With this guide arrangement, rubbing of the blade against the portions of the core that form the control rod channels takes place between the rubbing rods and not against the poison containing tubular members of the control rod or the fuel containing portions of the core.

This control rod arrangement may be formed either in a single blade or in the well-known cruciform configuration. With this control rod structure commercially available tubes may be employed for fabricating the same and by the use of these tubes, which have a circular cross section, excellent resistance to deformation from internal or external pressure is provided. It is essential that the tubes be joined together by an operation which will not distort the tubes so that accurate alignment of the tubes will be maintained. Ordinary welding would be unsatisfactory because of distortion and soldering would be unsatisfactory because of the weakness of the resulting juncture. Therefore adjacent tubes are joined either by brazing or by electron beam welding. The electron beam welding process admits of very precise control with regard to the application of the electron beam such that satisfactory results of joining the tubes together is achieved without distortion of the tubes. The brazing process, of course, provides for uniform heating of the tubes and thus joining them without distortion. The ends of the tubes may be welded in an ordinary fashion for the purpose of sealing the same, and the ends of the blades may be welded to the end fittings. These latter operations may be conducted without undesirable distortion. Furthermore, these operations are carried out prior to the joining of the tubes together and thus particularly in the brazing operation for thus joining the tubes. Any stresses caused by sealing the tube ends by welding will be relieved during this brazing operation.

While the tubes may be made of any suitable material which would be corrosive resistant and not subject to deformation because of radiation and which has suitable properties for which a suitable brazing material is available or for electron beam welding, it is preferred that the tubes be fabricated of stainless steel or Inconel. The poison material contained within the tubes may be any of the known materials of high neutron absorption cross section used for controlling reactivity in a reactor. One such preferred material is boron carbide.

Accordingly, it is an object of the present invention to provide an improved control rod for use with nuclear reactors.

Another object of the invention is to provide such an improved control rod which is fabricated of corrosion resistant tubular members containing therewithin a poison material with the members being joined into a rigid structure.

A still further object of the invention is to provide such a fabricated control rod which is relatively simple in construction such that it may be economically produced and yet is highly reliable and satisfactory in its operation.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth by the following detailed description of an illustrative embodiment, said embodiment being shown by the accompanying drawings wherein.

Figure 1:
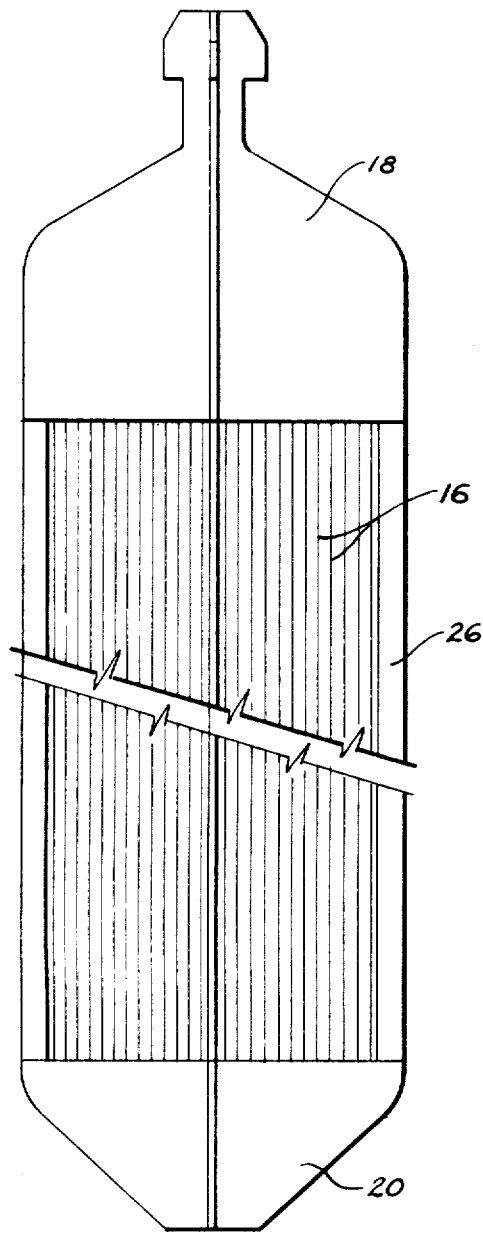
FIG. 1 is an elevational view of the control rod of the invention.
Figure 4:
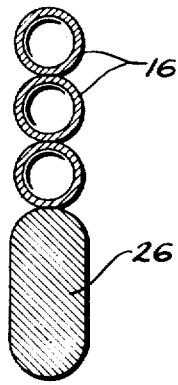
FIG. 4 is a fragmentary sectional view of a portion of the control rod.
Figure 3:
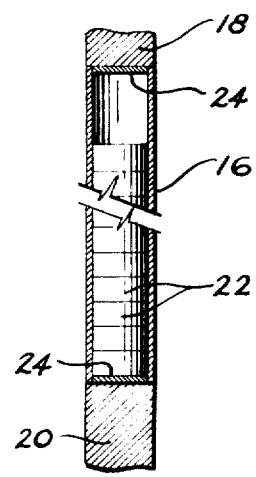
FIG. 3 is a fragmentary longitudinal sectional view of a portion of one of the tubular members of which the control rod is comprised.
Figure 2:
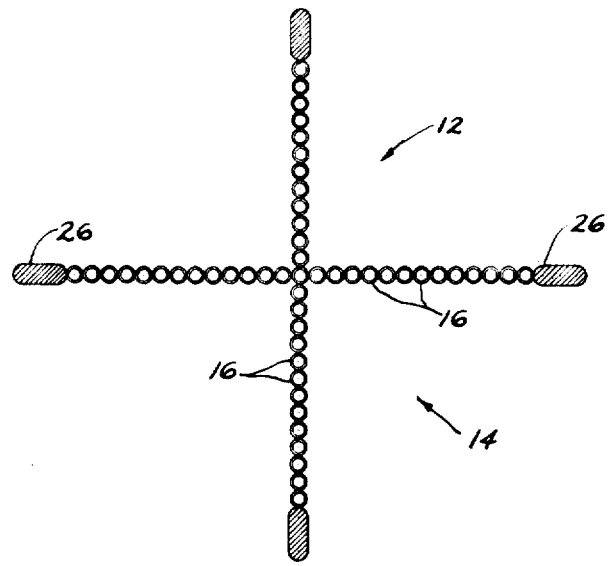
FIG. 2 is a transverse sectional view of the control rod.

Referring now to the drawings, wherein like reference characters are used throughout to designate like elements, the illustrative and preferred embodiment of the invention depicted therein includes a control rod designated generally 10 and which is of cruciform transverse configuration having two rows of tubes with these rows being identified as 12 and 14 in the FIG. 2 illustration and with each of these rows, in effect, forming a blade with the blades being intersected as disclosed. The tubes of which the control rod are comprised are identified as 16 and in each of the rows 12 and 14 these tubes are in parallel coplanar generally tangent relation. The tubes are preferably of stainless steel or Inconel although, as hereinbefore mentioned, other materials may be utilized. At the upper and lower end of the tube rows fittings 18 and 20 are provided with these fittings being of the same material as the tubes.

Each of the tubes 16 has disposed therein a neutron absorbing material, such as $B_4C$ with their being sufficient space left within the tubes for the accumulation of released gases that are produced during irradiation of the material as occurs during the operation of a reactor. This poison material may be in the form of a powder or in the form of slugs 22. After the material is disposed within a tube, the tube is welded closed at both ends with their being provided end caps 24 as disclosed in FIG. 3 and with these end caps being welded in place to hermetically seal the tube. The tube after thus being sealed is tested for leak tightness and thereafter the tubes are assembled in a suitable fixture which contains the end fittings 18 and 20. In the arrangement of FIGS. 1 through 4 there is also positioned in this fixture adjacent the endmost tubes of each row, or further down within the row if so desired, rubbing rods 26. These rods are coplanar with the row and have a thickness which is greater than the diameter of the tubes 16 such that they protrude each side of the row of tubes so as to act as a guide during insertion and removal of the control rod in the core of the reactor. Any rubbing that occurs between the control rod and the reactor core will thus be against this rod and not the tubes 16. For instance, the tube 16 may have an outside diameter of .165 inch while the rod 26 may have a thickness of .200 inch. This rod is formed of the same material as the tubes.

After assembling the tubes and these rubbing rods in the fixture, with the tubes of each of the rows and the respective rods being in coplanar tangent relation within this fixture, the tubes and rods are welded to the end fittings and thereafter the assembly is bonded (by brazing or electron beam welding) along the length of the tubes and at the juncture with the end fittings to thereby form a rigid structure.

It will be understood that the control rod is received in a suitable passageway or suitable passageways in the core of the reactor. This core will have guide rods or guide means which will engage the rubbing rod 26 to guide the insertion and removal of the control rod into and out of these passageways. Thus any rubbing action that takes place will be between these guiding elements of the core and the control rod and there will not be rubbing of the fuel elements of the reactor core and the control tubes of the control rod. The core is preferably comprised of parallel fuel elements among which are disposed the guiding elements.

Figure 5:
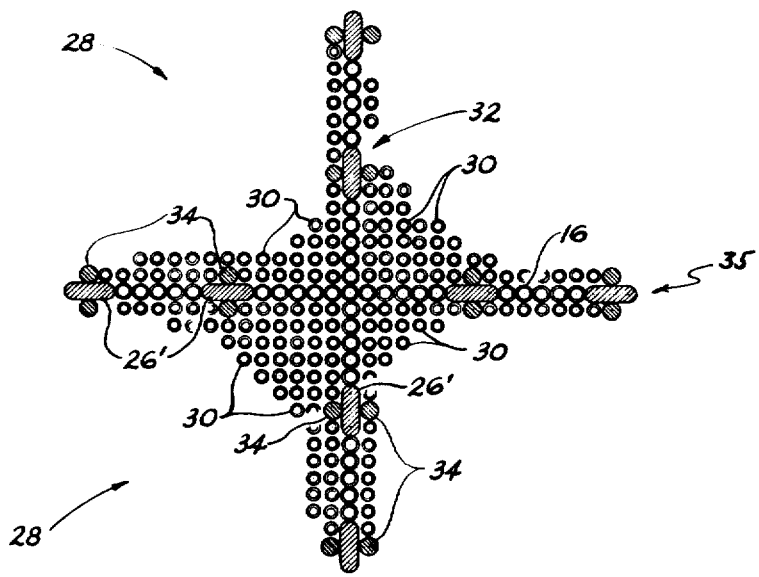
FIG. 5 is a fragmentary transverse sectional view of a modified embodiment of the invention.

In the modified embodiment depicted in FIG. 5 rather than having the rubbing rods of the control rod provided with a lateral dimension greater than the tubes of the control rod, the guides that form a portion of the core have a dimension such that they protrude somewhat into the passageway within which the control rod is received. In this illustrative organization of FIG. 5 there is depicted a portion of the core of the reactor with there being a portion of four fuel assemblies 28 being shown. These fuel assemblies are made up of fuel elements 30 retained in a particular array with these elements containing a nuclear fuel. Between adjacent assemblies is formed the passageway 32 within which is received the control rod hereinidentified generally at 35. As in the previously described arrangement, this control rod is made up of tubes 16 and rubbing rods 26'. The lateral dimension of these rods 26' may be the same as the diameter of the tubes 16. Positioned opposite the rubbing rods 26 as they are disposed in the passageway 32 are guide rods 34 which form part of the fuel assembly. These rods may, for example, be solid zirconium or stainless steel rods. They have a diameter somewhat greater than the diameter of the fuel elements 32 such that they extend laterally into the passageway 32 beyond the fuel elements such that these rods, together with the rubbing rods 26, provide a guiding action for guiding the control rod during its movement within the passage 32 and without the fuel elements 30 and the control tubes 16 coming into rubbing engagement.

It is essential to this invention that the tubular members 16 be a circular transverse configuration. This is so in order to provide the resistance to deformation that will be encountered from both external and internal pressure. Furthermore, with this tubing configuration wherein the tubes are tangent the bonding operation may be conducted in a very satisfactory manner without the production of voids or crevices wherein crevice corrosion may be produced.

With relation to prior art control rod design, the organization of the present invention has the following advantages:

(1) The control rod is a simple structure made up of parts which can be readily fabricated and tested prior to assembly resulting in less expensive construction and greater structural integrity.
(2) The finished rod should be less susceptible to corrosion since it contains no narrow passages or cracks for entrapment of foreign materials or has areas for crevice corrosion.
(3) Such control rods may be made with good dimensional control since the distortion from welding is small and since the brazing operation (where employed) relieves the built-in stresses in the parts.
(4) The material exposed to the reactor coolant may be stainless steel, Inconel, or any other material having suitable properties for bonding by brazing or electron beam welding.

While I have illustrated and described a preferred embodiment of my invention it is to be understood that such is merely illustrative and not restrictive and that variations and modifications may be made therein without departing from the spirit and scope of my invention. I therefore do not wish to be limited to the precise details set forth but desire to avail myself of such changes as fall within the purview of my invention.

What I claim is:

1. A control rod comprising in combination a plurality of parallel tubes in side-by-side relation, end fittings adjacent each end of said tubes with said tubes being welded to said end fittings, said tubes having a generally circular transverse configuration with there being disposed in said tubes a poison occupying less than the entire volume of the tubes, adjacent tubes being bonded together throughout their length by an operation that leaves the tubes generally without distortion, and rod members adjacent some of the tubes and bonded thereto by an operation that leaves the tubes and rod members generally without distortion, said rods acting as a rubbing guide during manipulation of the control rod.

2. The control rod of claim 1 wherein said rod members have a thickness greater than the tube so as to protrude laterally each side of the adjacent tube.

3. The control rod of claim 1 wherein said tubes are brazed together and said rod members are brazed to said tubes.

4. The control rod of claim 1 wherein said tubes are joined together and said rod members are joined to said tubes by electron beam welding.

5. A control rod arrangement for a nuclear reactor comprising a core having passageways for receipt of control rods, a plurality of control rod means for disposition within said passageways, at least some of said control rod means comprising a plurality of parallel tubes in side-by-side relation, end fittings adjacent each end of said tubes with said tubes being welded to said end fittings, said tubes having a generally circular transverse configuration with there being disposed in said tubes a neutron poison occupying less than the entire volume of the tubes, adjacent tubes being bonded together throughout their length by an operation that leaves the tubes generally without distortion, rod members parallel with the tubes and bonded thereto by an operation that leaves the tubes and rod members generally without distortion, said rod members acting as a rubbing guide during manipulation of the control rod means, and means extending inwardly of the passageway adjacent said rod members to engage the same for guiding the control rod means during manipulation.

6. The control rod arrangement of claim 5 wherein said tubes are brazed together and said rod members are brazed to said tubes.

7. The control rod of claim 5 wherein said tubes are joined together and said rod members are joined to said tubes by electron beam welding.

8. In combination a nuclear reactor core having a plurality of parallel fuel elements, said elements being arranged to provide a passageway for receipt of a control rod, a control rod for insertion and removal into and from said passageway, said rod being comprised of a plurality of adjacent parallel tubes, said tubes containing a neutron poison, end fittings at each end of said tubes and welded thereto to effectively seal said tubes, said tubes having a generally circular transverse configuration with adjacent tubes being bonded together throughout their length by an operation that leaves the tubes generally without distortion and with the tubes effectively forming a blade, guide means for guiding the blade during its insertion and removal into and from the passageway, said guide means including a rubbing rod disposed in parallel relation with the tubes and bonded to the tubes of the control rod by an operation that leaves the tubes and rod members generally without distortion, and guide rods forming part of the reactor core disposed at each side of the passageway and opposite said rubbing rod when the control rod is inserted in the passageway, said rubbing rod and guide rods being effective to guide the control rod and prevent the tubes of the control rod from contacting the fuel elements.

9. The organization of claim 8 wherein said passageways are formed by parallel fuel elements with these fuel elements being of circular transverse section and wherein the guide rods are parallel with the fuel elements adjacent the passageways and are generally coplanar therewith with these guide rods having a diameter greater than those of the fuel elements.

10. The organization of claim 8 wherein said guide rods protrude into the passageway beyond the fuel elements which form the passageway.

11. The organization of claim 8 wherein said rubbing rods extend laterally each side of the blade beyond the control rod tubes so as to engage the guide rods.

12. The combination of claim 8 wherein said tubes are brazed together and said rubbing rod is brazed to said tubes.

13. The control rod of claim 8 wherein said tubes are joined together and said rod members are joined to said tubes by electron beam welding.

14. A generally flat control rod blade comprising a plurality of parallel coplanar tubes of circular transverse section, said tubes being generally tangent and brazed together throughout their length, seal members welded to each end of the tubes to hermetically seal the same, the neutron poison material disposed within said tubes, said poison material occupying less than the full volume of said tubes, end fittings adjacent each end of said tubes and welded thereto and rod members parallel and coplanar with said tubes and brazed to said tubes so as to act as guides and rubbing rods during operation of the blade.

References Cited

UNITED STATES PATENTS

| 2,861,035 | 11/1958 | Zinn et al. | 176—86 |
| 3,138,536 | 6/1964 | Murrey et al. | 176—86 |
| 3,163,583 | 12/1964 | Widmer et al. | 176—86 |
| 3,194,743 | 7/1965 | Deddens | 176—86 |

CARL D. QUARFORTH, *Primary Examiner.*

H. E. BEHREND, *Assistant Examiner.*